3,024,126
METHOD OF TREATING REINFORCING SILICA
Eric D. Brown, Midland, Mich., assignor to Dow Corning Corporation, Midland, Mich., a corporation of Michigan
No Drawing. Filed June 15, 1960, Ser. No. 36,141
2 Claims. (Cl. 106—308)

This invention relates to a method of treating reinforcing silica with well-known functional silanes and siloxanes in contact with certain amine, quaternary ammonium and organometallic compounds.

The treatment of reinforcing silica with silanes and siloxanes containing such functional groups as the hydroxyl and alkoxyl radicals is well known in the art. However, it has now been found that certain compounds improve the effectiveness of this treatment. This new silica treatment is an improvement over previous treatments in that, for example, silicone rubber in which the treated silica is incorporated as a filler has some substantially improved ultimate physical properties, e.g. tensile strength, elongation, tear strength and/or the like, in all cases and in most cases has improved handling properties and little, if any, tendency to crepe harden.

The principal object of this invention is to provide a new effective method of treating reinforcing silica to render it hydrophobic. A corollary object of this invention is to provide an improved treated reinforcing silica which when incorporated into silicone rubber as a filler produces rubber having improved physical and handling properties over previously known, similarly prepared rubber.

This invention relates to the method for preparing a silica suitable for use as a filler in silicone rubber which comprises contacting in an organic solvent dispersion (A) a silica having a surface area of at least 50 square meters per gram as measured by nitrogen adsorption in the method described in ASTM Special Technical Bulletin No. 51, page 95 et seq. (1941), with a least about 0.01 part by weight per part of A of (B) an organosilicon compound containing in each molecule an average per silicon atom of from 0.1 to 2 radicals selected from the group consisting of the hydroxyl radical and alkoxy radicals and containing in each molecule an average per silicon atom of from 1 to 3 silicon-bonded organic radicals selected from the group consisting of perfluoroalkylethyl radicals of less than 13 carbon atoms and monovalent hydrocarbon radicals, there being in any molecule of B no more than about three silicon atoms having attached thereto as the only organic radicals two aliphatic monovalent hydrocarbon radicals per silicon atom, any remaining silicon valences being satisfied by siloxane oxygen atoms, and at least 0.01 part by weight per 100 parts of A of (C) a compound compatible with the organic solvent and selected from the group consisting of (1) an amino compound having a basic dissociation constant in dilute solution in water of at least $10^{-7}$ at 25° C., (2) a quaternary hydrocarbon-substituted ammonium hydroxide, (3) a salt of a phosphoric acid, the only active hydrogen atoms in said acid being attached to the phosphorous through an oxygen atom, and a basic amino compound, any active hydrogen in said basic amino compound being attached to a nitrogen atom, any remaining valences of said nitrogen atom in said basic amino compound being satisfied by carbon atoms, and (4) a salt of a carboxylic acid, the only active hydrogen atoms in said acid being a part of carboxyl groups, and a compound selected from the group consisting of (a) a basic amino compound, any active hydrogen in said basic amino compound being attached to a nitrogen atom, any remaining valences of said nitrogen atom in said basic amino compound being satisfied by carbon atoms, (b) a quaternary ammonium hydroxide (2) and (c) a metal ranging from lead to manganese inclusive in the electromotive series of metals.

The° organic solvents which can be employed in the method of this invention include, for example, hydrocarbons, halogenohydrocarbons, alcohols, ethers, esters, ketones, nitriles and amides.

More specifically, the organic solvents include aliphatic hydrocarbons such as hexane, 2-ethylhexane, hendecane, pentadecane, octylene, 1-dodecene, 2,3-dimethyl-1,3-butadiene and pentyne; cycloaliphatic hydrocarbons such as cyclopentane, cyclohexane, cyclohexene, cycloheptene and 1,4-cyclohexadiene; aromatic hydrocarbons such as benzene, toluene and xylene; halogenohydrocarbon solvents such as methylene chloride, 1-bromooctane, bromobenzene, o-bromotoluene, 1-chloro-1-propene, 1,3-dibromopropyne, chlorocyclohexane, bromocyclopentane, 1-bromo-3-iodobenzene and α-chloro-m-xylene; alcohols such as methanol, t-butanol and 2-ethylhexanol; ethers such as diethyl ether, allyl isoamyl ether, benzyl methyl ether, butyl o-tolyl ether, ethyl 2-furylmethyl ether, diheptyl ether, methyl 1-naphthyl ether, ethyl propargyl ether, phenyl vinyl ether, furan, tetrahydrofuran, 2-butoxymethyltetrahydrofuran, 3-methylfuran and tetrahydropyran; esters such as butyl acetate, amyl acetate, ethyl acetate, methyl butyrate, isoamyl isovalerate, methyl benzoate, pentyl hexanoate, methyl decanoate and benzyl laurate; ketones such as acetone, propylmethylketone, methylisobutylketone, acetylacetone, 1-phenyl-2-propanone, gamma-oxo-valerophenone, 2-furyl phenyl ketone and phenyl o-tolyl ketone; nitriles such as acetonitrile, α-ethylbutyronitrile, allyl cyanide and α-tolunitrile; and amides such as formamide, N,N-dimethylformamide and N-ethylformamide. Compounds such as ethoxyethanol, diacetone alcohol, methoxyacetone, methylethoxy acetate and ethyl pyruvate can also be used as solvents in the method of this invention. Preferably, hydrocarbons, halogenohydrocarbons, ethers and ketones are used which can be easily evaporated off to leave a dry treated reinforcing silica having optimum hydrophobic properties.

The silica A employed herein must be what is known as a reinforcing silica, i.e. a silica having a surface area of at least 50 square meters per gram as measured by the above-identified method. This silica can be, for example, a fume silica, a silica aerogel or a silica xerogel. The method of silica production is not critical, but the surface area of the silica is. Generally, the higher the surface area of silica is, the more desirable the silica is as a filler. It is preferable, therefore, that the silica have a surface area of at least 150 square meters per gram, more preferably above 300 square meters per gram. There is no critical maximum for the silica surface area, which can be 900 square meters per gram or more.

The organosilicon compound B is well known in the art. It includes both silanes and low molecular weight siloxanes containing in each molecule an average of from 0.1 to 2 total hydroxyl and/or alkoxyl radicals per silicon atom. The alkoxyl radicals can be, for example, methoxyl, ethoxyl, isopropoxyl, t-butoxyl, 2-ethylhexoxyl, dodecoxyl and octadecoxyl radicals. Preferably, however, the alkoxyl radicals contain less than four carbon atoms.

In each molecule of B there is also an average of from 1 to 3 silicon-bonded organic radicals per silicon atom. These organic radicals can be perfluoroalkylethyl radicals of less than 13 carbon atoms, i.e. radicals of the general formula $RCH_2CH_2$— where R is a perfluoroalkyl radical of less than 11 carbon atoms such as, for example, in the $CF_3CH_2CH_2$—, $C_2F_5CH_2CH_2$—, $C_7F_{15}CH_2CH_2$— and $C_{10}F_{21}CH_2CH_2$— radicals. The silicon-bonded organic radicals can also be any monovalent hydrocarbon radical such as, for example, any alkyl radical such as the methyl, ethyl, isopropyl, tert-butyl, 2-ethylhexyl, dodecyl, octadecyl and myricyl radicals; any alkenyl radical such as the vinyl, allyl, decenyl and hexadienyl radicals; any cycloalkyl radical such as the cyclopentyl and cyclohexyl radicals; any cycloalkenyl radical such as the cyclopentenyl, cyclohexenyl and cyclo-2,4-hexadienyl radicals; any aryl radical such as the phenyl, naphthyl and xenyl radicals; any aralkyl radical such as the benzyl, phenylethyl and xylyl radicals and any alkaryl radical such as the tolyl and dimethylphenyl radicals. Where B is a siloxane, there can be no more than about three di-aliphatic-monovalent-hydrocarbon-radical-substituted silicon atoms in any siloxane molecule. More than about three such silicon atoms in any siloxane B substantially reduce the effectiveness of the resulting treated silica no matter what other organic radicals are attached to the other silicon atoms in B. Preferably there is no more than one aliphatic monovalent hydrocarbon radical attached to each silicon atom in B.

Organosilicon compound B can have, for example, any of the following configurations where R' represents one of the above-described silicon-bonded perfluoroalkylethyl radicals, R'' represents a silicon-bonded aliphatic monovalent hydrocarbon radical, R''' represents any silicon-bonded monovalent hydrocarbon radical except the aliphatic monovalent hydrocarbon radicals and Y represents either a hydroxyl or alkoxyl radical:

$YSiR'R''_2$, $YSiR'''_2R''$, $YSiR''_3$, $YSiR'''_3$,
$YSiR''_2R'''$, $Y_2SiR'_2$, $Y_2SiR'R''$, $Y_2SiR'R'''$,
$Y_2SiR''_2$, $Y_2SiR''R'''$, $Y_2SiR'''_2$, $YSiR''_2OSiR''_2Y$,
$YSiR'R''(OSiR'R'')_{12}Y$, $YSiR''R'''(OSiR''R''')_{17}Y$,
$YSiR'''_2(OSiR'''_2)_2Y$, $R'R''_2Si(OSiR''R'')_5Y$,
$R''_3SiOSiR'''Y_2$, $Y_2SiR'''(OSiR''R''')_6OSiR'''Y_2$,
$Y_2SiR'''O(SiYR'''O)_6SiY_2R'''$ and $YSi(OSiR''R''')_3$.

This list does not contain all the possible compound types but merely suggests the variety of types. These compounds and their preparation are well known in the art.

To achieve effective treatment of the silica A it is necessary that at least about 0.01 part by weight of B be employed per part of A. Generally, the use of more than 1 part by weight of B per part of A is wasteful although an excess can be used. Preferably between 0.1 and 0.6 part of B per part of A is employed.

The amount of B necessary to effectively treat the silica A varies with the surface of the silica and the expected use of the treated silica. Each silica A depending on its total surface area and surface configuration requires some minimum amount of B to saturate its surface thereby producing the optimum hydrophobicity for that silica. Where the treated silicas of this invention are used alone, for example, as the contents of a life preserver, as flatting agents for paints or as thermal insulation, they can contain an excess of B. However, where the treated silicas are to be incorporated as fillers into silicone rubber compositions, it is desirable to remove any B in excess of that employed in saturating the silica surface since free B in such rubbers is usually detrimental to at least some physical properties. This can be done best by heating the treated silica at a temperature and for a time sufficient to evaporate the excess B.

For any silica A the minimum amount of B to saturate the silica surface can be most easily determined by setting up a series of samples using in a solvent dispersion varying amounts of B and a relatively volatile amine such as propylamine or diethylamine in a sufficient amount as defined below for treating A. After silica treatment is complete the amine is evaporated off with the solvent leaving any excess of B in the dry treated silica. A metal carboxylate as described below can be employed instead of the amine and need not be removed from the silica. The treated silica samples are then incorporated as fillers into identical standard silicone rubber formulations which are vulcanized, cured and tested to determine such physical properties as, for example, durometer, tensile strength, percent elongation at break and tear strength. Tensile strength, elongation and tear strength generally improve with increasing amounts of B in the treatment of A, but these property values level off and subsequently fall off. Where the property values level off, the filler A is essentially saturated thus determining the optimum amount of B for the treatment of A.

It has been determined that for fume silicas having an average surface area of about 180 square meters per gram (equivalent to about 7200 square meters per mol of A calculated as $SiO_2$) from about 0.05 to about 0.09 mol of B (added as a silanol or alkoxy silane) per mol of A (calculated as $SiO_2$) is sufficient to saturate the surface of A. This factor of from about 0.05 to about 0.09 gram mols of B per about 7200 square meters of filler A is useful for making rough estimates of the necessary amounts of B where the surface area of A is known. This factor holds true generally where B is a silane containing either one or two hydroxyl or alkoxyl groups or where B is a siloxane containing one hydroxyl or alkoxyl radical per molecule. However, where B is a siloxane containing more than one hydroxyl or alkoxyl radical per molecule, generally a smaller amount of B is necessary for silica surface saturation than is indicated by the estimation factor.

The compound C employed in this invention can be (1) ammonia or any of certain organic amines, grouped together as amino compounds, (2) a quaternary ammonium hydroxide, (3) a phosphoric acid salt of any basic amino compound, or (4) a carboxylic acid salt of (a) any basic amino compound, (b) any quaternary ammonium hydroxide (2) or (c) any metal ranging from lead to manganese inclusive in the electromotive series of metals. It is only necessary that the compound C employed herein is compatible with the organic solvent employed. If C is not compatible to the point of being easily dispersed in the solvent in an amount of at least 0.01 part by weight per 100 parts of A, the silica treatment is unsatisfactory.

The amino compounds (1) employed in the method of this invention must have a basic dissociation constant in dilute solution in water of at least $10^{-7}$ at 25° C. Thus, the amino compound can be ammonia, a primary amine, a secondary amine, a tertiary amine or any combination of these. Examples of operative amines include the following: brucine, sec-butylamine, cocaine, diethylbenzylamine, diethylamine, diisoamylamine, diisobutylamine, dimethylamine, dimethylaminomethylphenol, dimethylbenzylamine, dipropylamine, ethylamine, ethylenediamine, hydrazine, isoamylamine, isobutylamine, isopropylamine, menthanediamine, methylamine, methyldiethylamine, t-octylamine, t-nonylamine, piperidine, n-propylamine, t-octadecylamine, quinine, tetramethylenediamine, triethylamine, triisobutylamine, trimethylamine, trimethylenediamine, tripropylamine, L-arginine, L-lysine, aconitine, benzylamine, cinchonidine, codeine, coniine, emetine, ethanolamine, o-methoxybenzylamine, m-methoxybenzylamine, p-methoxybenzylamine, N,N-methoxybenzylamine, o - methylbenzylamine, m - methylbenzylamine, p-methylbenzylamine, N,N-methylbenzylamine, morphine, nicotine, novocain base, epsilonphenylamylamine, delta-phenylbutylamine, β-phenylethylamine, β-phenylethylmethylamine, gamma - phenylpropylamine, N,N - isopropylbenzylamine, physostigmine, piperazine, quinidine, solamine, sparteine, tetramethylguanidine, thebaine, t-butyl-2,4-dinitrophenylamine, t-butyl-2-hydroxy-5-nitro-benzylamine, t-butyl-4-isonitrosoamylamine, t-octylamylamine, t - octyl - 2 - (β - butoxyethoxy)ethylamine, 2,4,6-tris(dimethylamino)phenol, and veratrine. Also operative herein are condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, α,β-dimethylacrolein and amylamine, butyraldehyde and butylamine, acrolein and allylamine and formaldehyde and heptylamine. The preferred organic amines are the aminohydrocarbons, i.e. hydrocarbons in which the only functional atoms are amine nitrogen atoms.

Ammonia can be used by bubbling the gas through the solvent dispersion.

Also operative are such materials as the disiloxanes of the formula O[Si(CH$_3$)$_2$(CH$_2$)$_n$NH$_2$]$_2$ disclosed in U.S. Patent 2,557,803 and silanes of the formula

[PhMe$_2$Si(CH$_2$)$_n$]CHNH$_2$ and [Me$_3$Si(CH$_2$)$_n$]CHNH$_2$ disclosed in U.S. Patent 2,662,909.

Compound C can also be (2) a quaternary hydrocarbon-substituted ammonium hydroxide such as, for example, tetramethylammonium hydroxide, benzyltrimethylammonium hydroxide and phenyltrimethylammonium hydroxide.

Compound C can also be (3) a reaction product of a basic amino compound, i.e. ammonia or organic amines (including silylorganic amines), with a phosphoric acid.

More specifically, the basic amino compound can be ammonia, a primary amine, a secondary amine or a tertiary amine. The amine can contain one or more amino groups and can also contain carbon-bonded silicon atoms and other functional organic groups which are free of active hydrogen. It is necessary that the only active hydrogen atoms, if any, be attached to nitrogen atoms. An "active hydrogen" atom is one which forms methane when a compound containing said "active hydrogen" is reacted with methyl magnesium iodide at room temperature. Any other active hydrogen atoms interfere with the salt formation. The amino compound can, however, contain various non-interfering functional groups as shown in the following examples.

In short the term "basic amino compound" means compounds containing at least one nitrogen atom attached to no more than three carbon atoms any of which, if double-bonded, are double-bonded only to another carbon atom, e.g.

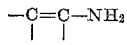

Specific examples of amines operative in the preparation of suitable salts are: o-aminoacetanilide, iminodiacetonitrile, m-aminoacetophenone, allylamine, N-methylallylamine, amylamine, N,N-dimethylamylamine, aniline, p-bromoaniline, 2,6-dinitroaniline, m-fluoroaniline, sym-bis - gamma - aminopropyl - tetramethyldisiloxane, gamma(N - aminoethylamino)propyldiphenylmethylsilane, o - iodoaniline, o - nitroaniline, 2,3,4,5 - tetrachloroaniline, o - anisidine, 9 - anthrylamine, 4,4' - diaminoazobenzene, anthranilonitrile, benzylamine, p-methoxybenzylamine, decylamine, diallylamine, dicyclohexylamine, diethylenetriamine, difurfurylamine, di-m-tolylamine, β-ethoxyethylamine, tetrahydrofurfurylamine, histamine, benzylhydrazine, p-bromophenylhydrazine, 1-methyl-1-phenylhydrazine, 4,4'-diaminohydrazobenzene, p$_3$-leucaniline, methylamine, morpholine, 5-nitroanaphthylamine, 1,2 - dimethyl - 4 - pentenylamine, N,N - diethyl - p - phenylenediamine, piperazine, piperidine, 2 - aminopryridine, 6 - nitro - o - toluidine, 2 - amino - p - toluntrile, 9 - phenanthrylamine, and tribenzylamine.

As stated above the salts (3) which are operative in this invention are the reaction products of any of the basic amino compounds described above, i.e. ammonia and primary, secondary and tertiary amines, both organic and silylorganic, with a phosphoric acid. The salt can be prepared with phosphoric acid or with any acid esters of phosphoric acid such as monovalent hydrocarbon substituted phosphoric acids, e.g. phenylphosphoric, monooctadecylphosphoric or diethylphosphoric acids. As in the basic amino compounds where any active hydrogen atoms are attached to nitrogen atoms, so in the acids any active hydrogen atoms must be a part of the acid groups, e.g.

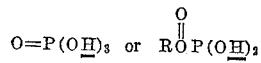

Examples of typical amines phosphates include eicosylamine phosphate, di-eicosylamine phosphate, eicosylamine diethylphosphate, N - methylcyclohexylamine phosphate, tetraethylene pentamine di-phosphate and 1,2-aminopropane phenylphosphate.

Compound C can also be (4) the salt of a carboxylic acid and (a) a basic amino compound as employed in (3), (b) a quaternary ammonium hydroxide as illustrated in (2) or (c) any of certain metals. In each case the only active hydrogen in the acid employed in preparing the salt must be a part of the acid group, e.g. RCOOH. The preferred acids are monocarboxylic acids, such as, for example, abietic acid, acetic acid, cyanoacetic acid, phenoxyacetic acid, acrylic acid, β-benzoylacrylic acid, angelic acid, anisic acid, N-acetylanthranilic acid, arachidic acid, atropic acid, benzoic acid, o-bromobenzoic acid, p-cyanobenzoic acid, 2,6-dichlorobenzoic acid, 2,5-dinitrobenzoic acid, m-fluoro-benzoic acid, brassidic acid, dl-campholic acid, capric acid, cinnamic acid, cyclohexanecarboxylic acid, cyclopropanecarboxylic acid, formic acid, 3-furancarboxylic acid, trimethylsilylacetic acid, 5-nitro-2-furoic acid, 10-hendecenoic acid, isobutyric acid, lauric acid, levulinic acid, lignoceric acid, linoleic acid, oleic acid, stearic acid, tetrahydropyromucic acid, 3-ethylpentanoic acid and 2,4-xylic acid.

Polycarboxylic acids while not preferred can also be employed in preparing the amine salt of this invention. Examples of such acids include: adipic acid, azelaic acid, o-carboxylmethoxybenzoic acid, 1-camphoric acid, 1,2-cyclobutanedicarboxylic acid, sym-bis-β-carboxyethyltetramethyldisiloxane, 1,2,3,4,5,6 - cyclohexanehaxacarboxylic acid, 1,3-cyclopentanedicarboxylic acid, diphenic acid, ethylmalonic acid, pimelic acid, sebacic acid, succinic acid and traumatic acid.

Examples of carboxylic acid salts of a basic amino compound which are operative in this invention include: di-2-ethylhexylamine acetate, triphenylsilpropylamine formate, trimethylsiloxydimethylsilhexylamine hexoate, 4,4'-diaminobenzophenone butyrate, 4,4'-diamino diphenyl ether decanoate, tri-n-butylamine acrylate, 3,4-dichloroaniline caproate, aniline octanoate, didodecylamine o-chlorophenoxyacetate, ethylamine 3-ethoxyproprionate, diethylene triamine monooleate, diisopropylamine palmitate, trimethylamine stearate, benzylhydrazine hexoate, 2,5-dimethylpiperazine octoate, di(octadecylamine) sebacate, ethylenediamine di-hexoate, and ammonium stearate together with the salts of any other of the amines and acids shown above. These examples are by no means complete, but they do illustrate some of the types of amine-type salts which can be used.

The amine-type salts are prepared by reacting ammonia, an organic amine or an aminoorganosilicon compound with a phosphoric or carboxylic acid. This can be accomplished by merely mixing the components alone in a relatively anhydrous system or by mixing the components together in a common solvent. This preparation is well known.

The amine-type salts can be normal, acidic or basic. The normal salts are those in which there are no unreacted amine or acid groups present as, for example, in

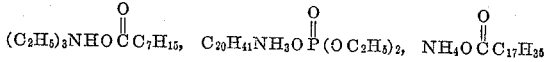

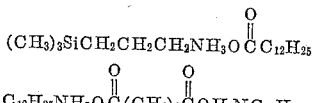

and

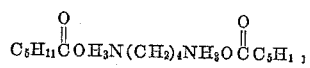

Actually, the normal salts, will often be acidic or basic depending on the relative basic and acidic characters of the amine and acid used to form the salt. This acidity or basicity can be balanced by adding an excess of the necessary amine or acid. The acidic salts are those in which there are unreacted acid groups present as, for example, in

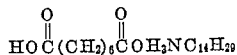

and

The basic salts are those in which there are unreacted amino groups present as, for example, in

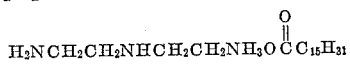

The salts employed in any particular organic solvent system are preferably compatible in that system. The degree of compatibility of any salt in any organic solvent system generally depends on the total number of carbon atoms and silicon atoms and their configuration in the salt to be employed. Thus, for example, in a given system the n-hexylamine salt of octanoic acid is compatible while the di-n-hexylamine salt of succinic acid is incompatible. However, the di-eicosylamine salt of succinic acid is compatible in that system. This is because it requires more carbon atoms in an amine salt of a polycarboxylic acid to render it compatible with an organic solvent operative in this invention than is the case with an amine salt of a monocarboxylic acid. Similarly, the mono-2-ethylhexyl amine salt of phenylphosphoric acid is compatible in a given system whereas it is necessary to go to the mono-eicosylamine salt of unsubstituted phosphoric acid to achieve compatibility in the same system. In any case compatibility can usually be improved by the use of silylorganic amine salts of these acids. For example, an organic amine salt of phosphoric acid preferably contains at least about 18 carbon atoms to make it sufficiently compatible in the organic solvent to be active whereas a silylorganic amine salt generally does not require so much carbon to render it compatible depending on the solubility characteristics of the system. For any particular system suitable salts can be selected on the basis of compatibility.

Compound C can also be a carboxylic acid salt of a quaternary ammonium hydroxide such as, for example, tetramethylammonium hexoate, phenyltrimethylammonium 2-ethylhexoate and benzyltrimethylammonium acetate.

Compound C can also be a carboxylic acid salt of a metal ranging from lead to manganese in the electromotive series of metals. Specifically, the metals included are lead, tin, nickel, cobalt, iron, cadmium, chromium, zinc and manganese. The term "carboxylic acid salt" as employed herein includes those salts which contain hydrocarbon radicals attached to the metal, for example, dibutyl tin diacetate.

Specific examples of salts which are operative in this invention are the naphthenates of the above metals such as lead naphthenate, cobalt naphthenate and zinc naphthenate, salts of fatty acids such as iron 2-ethylhexoate, lead 2-ethylhexoate, dibutyltin dilaurate and chromium octoate, salts of aromatic carboxylic acids such as dibutyltin dibenzoate, salts of polycarboxylic acids such as dibutyltin adipate and lead sebecate and salts of hydroxy carboxylic acids such as dibutyltin dilactate.

For the above metal carboxylates to be effective it is necessary that they be at least somewhat compatible in the solvent employed. This compatibility is enhanced by the use of carboxylic acids containing more than about six carbon atoms in the preparation of the salts.

Compound C must be sufficiently compatible in the organic solvent employed in this invention to be evenly dispersed in an amount equal to at least 0.01 part by weight of C per 100 parts of A. There is no critical maximum although more than 10 parts by weight of C per 100 parts of A is wasteful. The preferred range for maximum efficiency is from 0.1 to 5 parts by weight of C per 100 parts of A.

Where the treated silicas of this invention are used alone, for example, as flatting agents in paints or for thermal insulation, the choice and amount of C present in the filler is not critical within the above limitations. However, where the treated silicas are to be incorporated as fillers into peroxide-vulcanizable silicone rubber compositions, it is necessary to remove any amine-containing compound C since such amines and amine salts interfere with peroxide vulcanization. This can be done best by heating the treated silica at a temperature and for a time sufficient to evaporate the amine-containing compound C. These amines and amine salts as well as the quaternary ammonium compounds can be removed by washing the filler also. Where compound C is one of the defined metal carboxylates, it can remain in the silica without interfering with peroxide vulcanization of the silicone rubber.

The order of mixing the ingredients is not critical. However, the best method, i.e. the simplest method which appears to give the best results, is to disperse A, B and C in the organic solvent in that order. The solvent can then be removed, if desired, preferably by evaporation.

The method of this invention produces completely hydrophobed reinforcing silicas useful for thermal insulation and as flatting agents in paints. These silicas when incorporated as fillers into silicone rubber formulations substantially improve the physical properties, especially tear strength, of the cured rubber.

The following examples are merely illustrative of the best method of practicing this invention and are not intended to limit this invention which is properly delineated in the claims.

EXAMPLE 1

Two samples were prepared consisting of 20 grams of a reinforcing fume silica having a surface area of at least 180 square meters per gram as measured by nitrogen adsorption in the method described in ASTM Special Technical Bulletin No. 51, page 95 et seq. (1941), and 0.2 gram of n-hexylamine dispersed in 150 grams of toluene. To one sample were added 6.0 grams of phenyldimethylethoxysilane. To the other sample were added 6.1 grams of phenylmethyldimethoxysilane.

Each sample was agitated for from 1 to 4 days until an essentially minimum viscosity was reached. The toluene was evaporated off, and each of the dry treated fillers was heated at 150° C. for 4 hours in an air-circulating oven to remove the n-hexylamine and any excess silane.

Two rubber stocks were prepared employing 100 parts by weight of a vinyldimethyl-endblocked copolymer of 0.142 mol percent methylvinylsiloxane units and 99.858 mol percent dimethylsiloxane units, said copolymer having a Williams plasticity of 0.061 inch, 50 parts by weight of one of the above treated silicas as fillers and 1 part by weight of dichlorobenzoyl peroxide. These stocks were vulcanized by press-molding for 5 minutes at 125° C. and 3,000 p.s.i. and oven-cured for 1 hour at 150° C. plus 4 hours at 250° C.

The durometer D, tensile strength T (p.s.i.) and percent elongation at break E were then measured.

*Table I*

| Additive | D | T | E |
|---|---|---|---|
| $(C_6H_5)(CH_3)_2SiOC_2H_5$ | 64 | 1,590 | 410 |
| $(C_6H_5)(CH_3)Si(OCH_3)_2$ | 65 | 1,395 | 355 |

Similar results are obtained when phenylmethylvinylsilanol is substituted mol per mol for one-half of the phenyldimethylethoxysilane above.

Similar results are obtained when 0.1 gram and 0.8 gram of n-hexylamine are employed in place of the 0.2 gram of n-hexylamine.

EXAMPLE 2

The experiments of Example 1 were repeated employing in separate runs 8.1 grams of diphenylmethylethoxysilane, 9.1 grams of diphenyldiethoxysilane and 7.6 grams of diphenylmethylmethoxysilane in place of the silanes employed in Example 1.

The durometer D, tensile strength T (p.s.i.), percent elongation at break E and tear strength (pounds per inch) were then measured.

Table II

| Additive | D | T | E | Tear |
|---|---|---|---|---|
| $(C_6H_5)_2(CH_3)SiOC_2H_5$ | 57 | 1,640 | 500 | 130 |
| $(C_6H_5)_2Si(OC_2H_5)_2$ | 62 | 1,420 | 420 | 118 |
| $(C_6H_5)_2(CH_3)SiOCH_3$ | 46 | 1,410 | 620 | 188 |

For comparison similarly prepared rubber stocks employing fillers treated as in Examples 1 and 2 but in the absence of the amine have the following typical properties:

| D | T | E | Tear |
|---|---|---|---|
| 70 | 900 | 200 | 70 |

EXAMPLE 3

20 grams of the reinforcing fume silica of Example 1 were treated with 8.1 grams of diphenyldimethoxy silane in contact with 0.2 gram of n-hexylamine, were dried and were freed of the amine and excess silane according to the method of Example 1.

A rubber was prepared, vulcanized and cured according to the method of Example 1 employing as components 50 parts by weight of the above silica as a filler, 100 parts by weight of a copolymer of 92.358 mol percent dimethylsiloxane units, 7.5 mol percent phenylmethylsiloxane units and 0.142 mol percent methylvinylsiloxane units, said copolymer having a Williams plasticity of about 0.060 inch, and 1 part by weight of dichlorobenzoyl peroxide.

The durometer D, tensile strength T (p.s.i.), percent elongation at break E and tear strength (pounds per inch) were then measured.

Table III

| D | T | E | Tear |
|---|---|---|---|
| 31 | 1,410 | 770 | 223 |

Similar results are obtained when triphenylsilanol is substituted mol per mol for the diphenyldimethoxysilane above.

EXAMPLE 4

20 grams of the reinforcing fume silica of Example 1, 0.2 gram of n-hexylamine and 5.4 grams of 3,3,3-trifluoropropylmethyldimethoxysilane were mixed in 160 grams of acetonitrile. This sample was agitated until an essentially minimum viscosity was reached. The acetonitrile was evaporated off, and the dry treated filler was heated at 150° C. for 4 hours in an air-circulating oven to remove the n-hexylamine and any excess silane.

50 parts by weight of the above-treated silica were milled into 100 parts by weight of a copolymer of 99.5 mol percent 3,3,3-trifluoropropylmethylsiloxane units and 0.5 mol percent methylvinylsiloxane units, said copolymer having a Williams plasticity of about 0.100 inch, with 1 part by weight of dichlorobenzoyl peroxide. This stock was vulcanized by press-molding for 5 minutes at 125° C. and 3,000 p.s.i. and oven-cured for 24 hours at 150° C.

The durometer D, tensile strength T (p.s.i.), percent elongation at break E and tear strength (pounds per inch) were then measured.

Table IV

| D | T | E | Tear |
|---|---|---|---|
| 53 | 1,710 | 390 | 179 |

Similar results are obtained when 3,3,4,4,5,5,5-heptafluoropentyldimethylsilanol, bis-3,3,3-trifluoropropyldipropoxysilane and 3,3,3-trifluoropropylphenylsilanediol are each substituted mol per mol for the 3,3,3-trifluoropropylmethyldimethoxysilane above.

For comparison similarly prepared fluorinated rubber stocks employing a filler treated as above described but in the absence of the amine have the following typical properties:

| D | T | E | Tear |
|---|---|---|---|
| 55 | 1,000 | 170 | 70 |

EXAMPLE 5

When the following amounts of the siloxane shown below are mixed with separate dispersions each made up of 60 grams of the reinforcing fume silica of Example 1 and .005 gram-mol of the following salts in 500 grams of toluene and each of the resulting treated silicas is dried, the resulting dry treated silicas give similar excellent physical properties when incorporated as fillers into rubber as described in Example 3.

| Amount (grams) | Siloxane | Salt |
|---|---|---|
| 32 | $HO[Si(C_6H_5)(CH_3)O]_{18}H$ | Lead naphthenate. |
| 21.2 | $HO[Si(C_6H_5)_2O]_3H$ | Cobalt octoate. |
| 13.5 | $(C_6H_{11})(CH_3)_2SiOSi(CH_3)_2OC_2H_5$ | Dibutyltin dibenzoate. |
| 15.5 | $CH_3C_6H_4SiO[Si(C_6H_5)(CH_3)O]_6SiC_6H_4CH_3$ with $CH_3$, O, $CH_3$ groups | Dibutyltin dilaurate. |

EXAMPLE 6

When 11.8 grams of $HO[Si(CH_3)(CH_2CH_2CF_3)O]_{13}H$ are substituted for the 5.4 grams of 3,3,3-trifluoropropylmethyldimethoxysilane in the experiment of Example 4, a treated silica results which when incorporated as a filler into a rubber stock according to the method of Example 4 yields a rubber having similar excellent physical properties.

EXAMPLE 7

When any of the following amines is substituted mol per mol for the n-hexylamine in the experiment of Example 1, a treated silica results which when incorporated as a filler into a rubber stock according to the method of Example 1 yields a rubber having similar excellent physical properties.

Triethylamine
Ethylenediamine
N-methylbutylamine
Benzylamine
Piperazine

EXAMPLE 8

When 0.002 gram-mol of any of the following materials is mixed with 20 grams of the reinforcing fume silica employed in Example 1 dispersed in 150 grams of toluene and either 3.0 grams of trimethylsilanol or 5.55 grams of tetramethyldisiloxanediol and the resulting sample is agitated until an essentially minimum viscosity is reached after which the toluene is evaporated off, the resulting treated silica is an excellent flatting agent for paint as well as a satisfactory component for thermal insulation.

The condensation product of formaldehyde and methylamine
n-Hexylamine octoate
Di-2-ethylhexylamine acetate
Trimethylamine stearate
Triphenylsilpropylamine formate
Ethylene diamine di-hexoate
Ammonium stearate
1,2-aminopropane phenylphosphate
Eicosylamine phosphate
Benzyltrimethylammonium hydroxide
Phenyltrimethylammonium 2-ethylhexoate

EXAMPLE 9

When 50 grams of a reinforcing silica xerogel having a surface area of about 720 square meters per gram or 90 grams of a reinforcing fume silica having a surface area of about 400 square meters per gram, the surface areas being measured by nitrogen adsorption in the method described in ASTM Special Technical Bulletin No. 51, page 95 et seq. (1941), are substituted for the reinforcing fume silica in the experiments of Example 1 and the amounts of phenyldimethylethoxysilane and phenylmethyldimethoxysilane are increased to 60 grams and 61 grams respectively, the resulting treated silicas when incorporated as fillers in the rubber stocks prepared in accordance with Example 1 yield rubbers having excellent physical properties.

That which is claimed is:

1. The method for preparing reinforcing silica which consists of dispersing and contacting in an organic solvent (A) a silica having a surface area of at least 50 square meters per gram as measured by nitrogen adsorption in the method described in ASTM Special Technical Bulletin No. 51, page 95 et seq. (1941), with at least about 0.01 part by weight per part of A of (B) an organosilicon compound containing in each molecule an average per silicon atom of from 0.1 to 2 silicon-bonded radicals selected from the group consisting of the hydroxyl radical and alkoxyl radicals and containing in each molecule an average per silicon atom of from 1 to 3 silicon-bonded organic radicals selected from the group consisting of perfluoroalkylethyl radicals of less than 13 carbon atoms and monovalent hydrocarbon radicals, there being in any molecule of B no more than about three silicon atoms having attached thereto as the only organic radicals two aliphatic monovalent hydrocarbon radicals per silicon atom, any remaining silicon valences being satisfied by siloxane oxygen atoms, and at least 0.01 part by weight per 100 parts of A of (C) a compound compatible with the organic solvent and selected from the group consisting of (1) an amino compound having a basic dissociation constant in dilute solution in water of at least $10^{-7}$ at 25° C., (2) a quaternary hydrocarbon-substituted ammonium hydroxide, (3) a salt of phosphoric acid, the only active hydrogen atoms in said acid being attached to the phosphorous through an oxygen atom, and a basic amino compound, any active hydrogen in said basic amino compound being attached to a nitrogen atom, any remaining valences of said nitrogen atom in said basic amino compound being satisfied by carbon atoms, and (4) a salt of a carboxylic acid, the only active hydrogen atoms in said acid being a part of carboxyl groups, and a compound selected from the group consisting of (a) a basic amino compound, any active hydrogen in said basic amino compound being attached to a nitrogen atom, any remaining valences of said nitrogen atom in said basic amino compound being satisfied by carbon atoms, (b) a quaternary ammonium hydroxide (2) and (c) a metal ranging from lead to manganese inclusive in the electromotive series of metals.

2. The method of claim 1 in which the organic solvent, any unreacted organosilicon compound B and any amine-containing compound are removed.

References Cited in the file of this patent

UNITED STATES PATENTS

| | | |
|---|---|---|
| 2,666,754 | Sears | Jan. 19, 1954 |
| 2,881,146 | Remer et al. | Apr. 7, 1959 |
| 2,884,402 | Bachman et al. | Apr. 28, 1959 |
| 2,886,460 | Alexander et al. | May 12, 1959 |
| 2,938,010 | Bluestein | May 24, 1960 |

UNITED STATES PATENT OFFICE
CERTIFICATE OF CORRECTION

Patent No. 3,024,126                          March 6, 1962

Eric D. Brown

It is hereby certified that error appears in the above numbered patent requiring correction and that the said Letters Patent should read as corrected below.

Column 3, line 26, for "R″" read -- R‴ --; column 12, line 19, for "a salt of phosphoric" read -- a salt of a phosphoric --

Signed and sealed this 15th day of January 1963.

SEAL)
Attest:

ERNEST W. SWIDER
Attesting Officer

DAVID L. LADD
Commissioner of Patents